United States Patent
Wang et al.

(10) Patent No.: US 12,192,760 B2
(45) Date of Patent: *Jan. 7, 2025

(54) HANDS FREE INTERACTION SYSTEM AND METHOD

(71) Applicant: Visa International Service Association, San Francisco, CA (US)

(72) Inventors: Quan Wang, Foster City, CA (US); Kyle Crouse, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,987

(22) Filed: Dec. 7, 2022

(65) Prior Publication Data

US 2023/0122422 A1 Apr. 20, 2023

Related U.S. Application Data

(63) Continuation of application No. 16/647,329, filed as application No. PCT/US2017/052481 on Sep. 20, 2017, now Pat. No. 11,558,741.

(51) Int. Cl.
*H04W 12/06* (2021.01)
*H04L 9/32* (2006.01)
(Continued)

(52) U.S. Cl.
CPC ........... *H04W 12/06* (2013.01); *H04L 9/3247* (2013.01); *H04L 63/0869* (2013.01);
(Continued)

(58) Field of Classification Search
CPC .... H04W 12/06; H04W 12/64; H04L 9/3247; H04L 63/0869; H04L 63/0884
See application file for complete search history.

(56) References Cited

U.S. PATENT DOCUMENTS

| 10,244,348 B2 | 3/2019 | Kostka et al. |
| 2015/0149924 A1 | 5/2015 | Tsai et al. |

(Continued)

FOREIGN PATENT DOCUMENTS

| CN | 106304046 A | 1/2017 | |
| EP | 2991041 A2 * | 3/2016 | ............. G07B 15/02 |

(Continued)

OTHER PUBLICATIONS

U.S. Appl. No. 16/647,329, Advisory Action, Mailed On Aug. 17, 2022, 3 pages.

(Continued)

*Primary Examiner* — Piotr Poltorak
*Assistant Examiner* — Lydia L Noel
(74) *Attorney, Agent, or Firm* — Kilpatrick Townsend & Stockton LLP (57) ABSTRACT

A method is disclosed. The method includes receiving a broadcast signal from a beacon device, the broadcast signal encoding a first credential associated with a first entity. In response to receipt of the broadcast signal, the mobile communication device transmits the received first credential to an authentication system. The authentication system determines if the first entity associated with the broadcast signal is authentic and generates a confirmation message confirming the authenticity of the first entity. The mobile communication device then receives the confirmation message indicating that the first entity is authentic. The mobile communication device thereafter receives and transmits a second credential for the mobile communication device to the beacon device, which transmits the second credential to the authentication system. The authentication system then confirms the authenticity of the mobile communication device. Then, the beacon device can initiate an interaction process with the user of the mobile communication device.

18 Claims, 5 Drawing Sheets

(51) Int. Cl.
  *H04L 9/40* (2022.01)
  *H04W 12/64* (2021.01)
  *H04W 88/02* (2009.01)

(52) U.S. Cl.
  CPC ......... *H04L 63/0884* (2013.01); *H04W 12/64* (2021.01); *H04W 88/02* (2013.01)

(56) References Cited

U.S. PATENT DOCUMENTS

| | | | | |
|---|---|---|---|---|
| 2015/0248702 | A1* | 9/2015 | Chatterton | G06Q 30/0261 705/14.58 |
| 2016/0012414 | A1* | 1/2016 | Chitilian | G06Q 20/3227 705/76 |
| 2016/0055690 | A1* | 2/2016 | Raina | H04W 40/244 340/5.61 |
| 2016/0055692 | A1 | 2/2016 | Trani | |
| 2016/0148150 | A1 | 5/2016 | Curtat et al. | |
| 2016/0232518 | A1 | 8/2016 | Butler, IV | |
| 2017/0039613 | A1* | 2/2017 | Kaehler | G02B 27/0172 |
| 2017/0171754 | A1 | 6/2017 | South et al. | |
| 2017/0178104 | A1* | 6/2017 | Fernandez | G06Q 30/0281 |
| 2017/0249508 | A1 | 8/2017 | Dubuque | |
| 2018/0158051 | A1* | 6/2018 | Arora | G06Q 20/401 |
| 2018/0260879 | A1* | 9/2018 | Bergner | H04L 9/14 |

FOREIGN PATENT DOCUMENTS

| | | | | |
|---|---|---|---|---|
| GB | 2542472 A | * | 3/2017 | ............ A47F 10/04 |
| JP | 2010015201 A | * | 1/2010 | |
| KR | 20170033832 A | * | 3/2017 | |
| WO | 2017100628 A1 | | 6/2017 | |

OTHER PUBLICATIONS

U.S. Appl. No. 16/647,329 , Final Office Action, Mailed On May 27, 2022, 19 pages.
U.S. Appl. No. 16/647,329 , Non-Final Office Action, Mailed On Feb. 1, 2022, 22 pages.
U.S. Appl. No. 16/647,329 , "Notice of Allowability", Sep. 30, 2022, 6 pages.
U.S. Appl. No. 16/647,329 , Notice of Allowance, Mailed On Sep. 26, 2022, 9 pages.
Application No. EP17925988.2 , Extended European Search Report, Mailed On Jul. 15, 2020, 10 pages.
Application No. PCT/US2017/052481 , International Preliminary Report on Patentability, Mailed On Apr. 2, 2020, 10 pages.
Application No. PCT/US2017/052481 , International Search Report and Written Opinion, Mailed On Jun. 15, 2018, 13 pages.
Application No. EP17925988.2 , Office Action, Mailed On Feb. 10, 2023, 6 pages.
Application No. EP17925988.2 , Office Action, Mailed On Dec. 5, 2023, 5 pages.

* cited by examiner

HANDS FREE INTERACTION SYSTEM AND METHOD

CROSS REFERENCE TO RELATED APPLICATIONS

This application is a continuation of U.S. patent application Ser. No. 16/647,329 filed Mar. 13, 2020, which is the US national stage of PCT/US2017/052481, filed Sep. 20, 2017, the disclosures of which are incorporated herein by reference in their entirety.

BACKGROUND

In a typical interaction between a resource provider and a user, the user gathers a group of desired objects at the resource provider location. The user then takes an access token such as a card from his or her possession. The access token is then used to physically interact with an access device at the resource provider location. For example, the user may have a card and may insert it into the access device. Approvals are obtained, and the user is allowed to leave with the gathered objects. The access token provides security for the interaction since it provides certain authentication data (e.g., cryptograms) to the access device, which a subsequent authorizing entity uses to determine if the user's access token is authentic. This helps to ensure that the interaction conducted between the user and the resource provider is not fraudulent.

While such methods can be secure, conventional methods of interaction are cumbersome, since they require the physical manipulation of an access token. Further, there may be a line of users waiting to exit the resource provider's location, because there may be too few available interaction devices. Such conventional methods of interaction can also be slow and can frustrate users.

Some have suggested various ways of hands free interaction with a resource provider at the resource provider's location to improve the interaction speed between a resource provider and a user. The user may have a mobile communication device that can interact with one or more broadcasting devices at the resource provider location. The user's mobile communication device can pass credentials such as account numbers over the air to a wireless device operated by a resource provider, and the resource provider can finish the interaction with this information.

A number of problems exist with conventional hands free interaction systems. First, wireless signals from a variety of different sources can be received by a user's mobile communication device in a conventional hands free interaction system. The mobile communication device may have difficulty determining which signal is the one associated with the resource provider that the user wants to interacting with. If the user transmits sensitive credentials on the user's mobile communication device to the wrong entity, the user's sensitive credentials can be stolen and used in a fraudulent manner. Second, the proposed hands free interaction method does not provide the same level of security as conventional interaction methods where a user needs to physically manipulate an access token to interact with an access device. For example, a resource provider, receiving an interaction signal from a mobile communication device, does not know if the user of that mobile communication device is in fact an authentic user. Third, conventional hands free interaction systems do not require the use of a human employed by the resource provider or require a specific physical interaction between an access token and an access device. Consequently, there are risks that the user may be able to leave the location of the resource provider with a set of objects gathered by the user at the resource provider's location without proper assurance that the user is authorized to do so.

Embodiments of the invention address these and other problems, individually and collectively.

BRIEF SUMMARY

Embodiments of the disclosure are directed to methods and systems for hands free interaction at a specific location.

One embodiment of the invention is directed to a method comprising receiving, by a mobile communication device operated by a user, a broadcast signal from a beacon device, the broadcast signal encoding a first credential associated with a first entity. In response to receipt of the broadcast signal, the method includes determining, by the mobile communication device, an authentication system. The method also includes transmitting, by the mobile communication device, the received first credential to the authentication system. The authentication system determines if the first entity associated with the broadcast signal is authentic and generates a confirmation message confirming the authenticity of the first entity. The method also includes receiving, from the authentication system, the confirmation message indicating that the first entity is authentic, and transmitting, by the mobile communication device, a communication to the beacon device comprising a second credential for the mobile communication device. The beacon device thereafter transmits the second credential to the authentication system. The authentication system determines if the mobile communication device is authentic and generates a confirmation message confirming the authenticity of the mobile communication device. The beacon device thereafter initiates an interaction process with a user of the mobile communication device.

Another embodiment of the invention is directed to a mobile communication device comprising one or more processors, and a memory including instructions that, when executed by the one or more processors cause the mobile communication device to perform the above noted method.

Another embodiment of the invention is directed to a method. The method comprises providing, by a beacon device to a mobile communication device operated by a user, a broadcast signal, the broadcast signal encoding a first credential associated with a first entity. In response to transmitting of the broadcast signal, the mobile communication device determines an authentication system, and transmits the received first credential to an authentication system, wherein the authentication system determines if the first entity associated with the broadcast signal is authentic and generates a confirmation message to the mobile communication device confirming the authenticity of the first entity. The method also includes receiving, by the beacon device, a second credential from the mobile communication device, and transmitting, by the beacon device, the second credential to the authentication system. The authentication system thereafter verifies the authenticity of the second credential. The method also includes receiving, by the beacon device, from the authentication system, a confirmation message confirming the authenticity of the mobile communication device, and initiating, by the beacon device, an interaction process with a user of the mobile communication device in response to receiving the confirmation message.

These and other embodiments of the invention are described in further detail below.

DETAILED DESCRIPTION

Embodiments of the invention are directed to systems and methods for improving upon conventional interaction systems. In one embodiment, the method includes receiving a broadcast signal from a beacon device, the broadcast signal encoding a first credential associated with a first entity. In response to receipt of the broadcast signal, the mobile communication device transmits the received first credential to an authentication system. The authentication system determines if the first entity associated with the broadcast signal is authentic and generates a confirmation message confirming the authenticity of the first entity. The mobile communication device then receives the confirmation message indicating that the first entity is authentic. The mobile communication device thereafter receives and transmits a second credential for the mobile communication device to the beacon device, which transmits the second credential to the authentication system. The authentication system then confirms the authenticity of the mobile communication device. Then, the beacon device can initiate an interaction process with the user of the mobile communication device.

Prior to discussing the details of some embodiments of the present invention, description of some terms may be helpful in understanding the various embodiments.

An "access device" may be any suitable device that provides access to a system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile communication device. The POS terminal may or may not initiate processing of transactions.

In some embodiments, an access device may be remote (e.g., greater than 1 mile from the point of interaction) with respect to a location where an interaction between a user's mobile communication device and a beacon device is taking place. In such embodiments, the access device may be one or more computers running a virtual instantiation of a physical access device that could be located at the location. The virtual instantiation may have all of the functionality of a physical access device at a point of interaction. Further, the remote access device may be a cloud based system that may operate across multiple computers in a network.

An "account token" may include a substitute identifier for some information. For example, a payment token may include an identifier for a payment account that is a substitute for an account identifier, such as a primary account number (PAN). For instance, an account token may include a series of alphanumeric characters that may be used as a substitute for an original account identifier. For example, an account token "4900 0000 0000 0001" may be used in place of a PAN "4147 0900 0000 1234." In some embodiments, an account token may be "format preserving" and may have a numeric format that conforms to the account identifiers used in existing payment processing networks (e.g., ISO 8583 financial transaction message format). In some embodiments, an account token may be used in place of a PAN to initiate, authorize, settle or resolve a payment transaction. The account token may also be used to represent the original credential in other systems where the original credential would typically be provided. In some embodiments, an account token value may be generated such that the recovery of the original PAN or other account identifier from the token value may not be computationally derived. Further, in some embodiments, the account token format may be configured to allow the entity receiving the account token to identify it as an account token and recognize the entity that issued the account token.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc. An "authorizing entity computer" may be a computer operated by or associated with an authorizing entity and may be implemented by, for example, a server computer.

A "blockchain" can be a distributed database that maintains a continuously-growing list of records secured from tampering and revision. A blockchain may include a number of blocks of interaction records recorded on one or more nodes. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

A "credential" may comprise any evidence of authority, rights, or entitlement to privileges. In some embodiments, a credential for an entity may be a public key of a public/private key pair, where only the entity is in possession of the private key of the public/private key pair. In some embodiments, a credential may be one that has been validated by an authentication system. For example, a credential may be a public key that has been signed by a private key of the authentication system to form a digital signature. The credential could also be a combination of the public key and the digital signature. The public key may be used to identify a particular entity, and the digital signature may serve as proof that the authentication system previously verified by entity.

In some embodiments, access credentials may comprise permissions to access certain tangible or intangible assets, such as a building or a file. In another example, payment credentials may include any suitable information associated with and/or identifying an account (e.g., a payment account and/or a payment device associated with the account). Such information may be directly related to the account or may be derived from information related to the account. Examples of account information may include an "account identifier" such as a PAN (primary account number or "account number"), an eID, a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

An "issuer" may typically refer to a business entity (e.g., a bank) that maintains an account for a user. An issuer may also issue payment credentials stored on communications devices.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. A "signed key" may include a public key that has been digitally signed by a private key.

A "node" may refer to a computing device. In some embodiments, a node may be attached to a network. A node may be capable of creating, receiving, and/or transmitting data over the network. A node may further be capable of performing calculations and any other computing operations.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. In some embodiments, the public key may be generated by another entity. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" is a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "transaction identifier" may be any unique combination of letters, numbers, and/or symbols relating to a particular transaction. For example, with respect to the recording of a new entry on a blockchain, the transaction identifier may be a hash of some or all of the data on the blockchain (e.g., the header, the transactions, and/or the entire block). The hash may be unique to that entry on the blockchain, such that no other entries are associated with that hash.

A "transaction processing computer" may include a network of one or more devices that can process and route transaction request messages. An exemplary transaction processing computer may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

A "mobile communication device" may comprise any electronic device that may be transported and operated by a user, which may also optionally provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may comprise any suitable hardware and software for performing such functions, and may also include multiple devices or components (e.g. when a device has remote access to a network by tethering to another device—i.e. using the other device as a modem—both devices taken together may be considered a single mobile communication device).

A "beacon device" can include a hardware transmitter that can broadcast their identity to nearby mobile communication devices. A beacon device can enable smartphones and tables and other devices to perform actions when in proximity to the beacon device. An example of a beacon device can be a BLE beacon. A BLE beacon is a wireless device that periodically broadcast a Bluetooth Low Energy advertising packet, that is received by a smartphone and used to determine the position with respect to the beacon itself. The advertising packet can include a UUID, a major ID, and minor ID. The UUID may correspond to a particular entity such as a merchant, and an application on a mobile communication device may be configured to recognize the UUID. Major IDs may correspond to a specific location (e.g., store) identifier, and a minor ID may correspond to a specific sublocation (e.g., an area in a store) within the location.

An "item identifier" may be any suitable string of characters or symbols used to uniquely identify an item (e.g., a tangible or intangible asset) within a computerized environment. In some embodiments, the item identifier may be a value calculated by hashing one or more input values related to the item. In this way, the item identifier may be independently generated by any entity that has the prerequisite information (e.g., an entity in possession of the item). In some embodiments, the item identifier may correspond to a Universal Product Code (UPC) and serial number or other identifier. Some items may include an indication of their respective item identifiers (e.g., within a barcode or other machine-readable code associated with the item).

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

Figure 1:
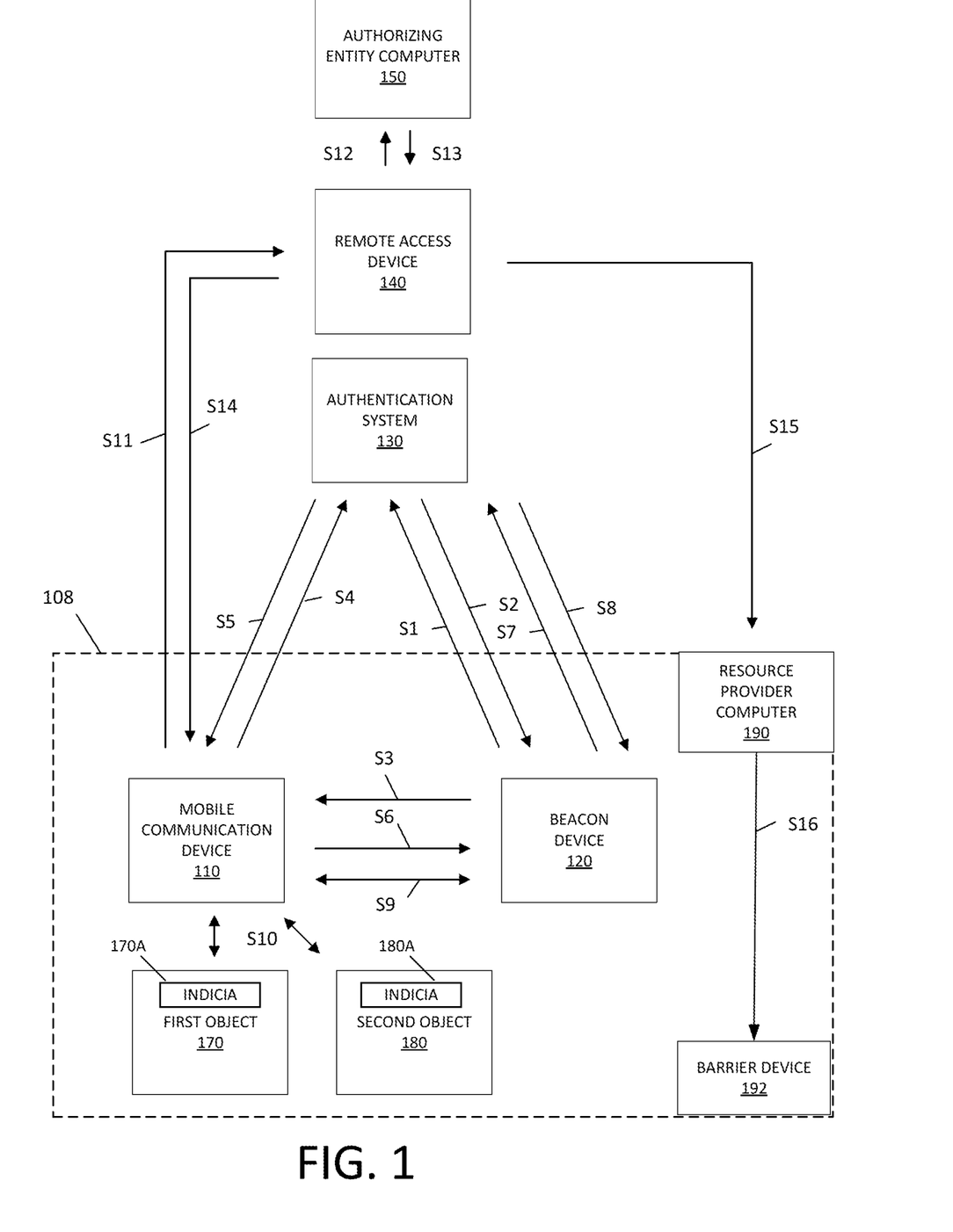
FIG. 1 shows a block diagram of an exemplary system according to an embodiment of the invention.

FIG. 1 shows a block diagram of a system according to an embodiment of the invention. The system can include a number of devices and objects at a location 108. The location 108 may be any suitable defined area including a merchant location, a transportation location (e.g., a train station), or any other suitable interaction location. In this example, the location 108 may have a barrier device 192 that may allow or control access to and from the location 108. In some embodiments, the barrier device 192 could include electromagnetic sensors which may sense RF ID tags on objects (e.g., items that have been purchased) that might pass through the gate. In some embodiments, the barrier device 192 may include an actuating device that actuates (e.g., a turnstile) to allow or not allow a user to exit the location 108. In other embodiments, the barrier device 192 may include an alarm that may signal improper entry or exit to the location 108.

In the location 108, an interaction between an entity associated with the location 108 and a user may take place. For example, in some embodiments, the entity may be a resource provider such as a merchant and the user may be a consumer of that merchant. The merchant and the consumer may interact with each other at the location 108 to perform a purchase transaction or any other suitable interaction. The user may operate a mobile communication device 110 while the resource provider may operate a beacon device 120. Although one beacon device 120 and one mobile communication device 110 are illustrated, there can be many more of them at the location 108. As will be described in detail below, the beacon device 120 and the mobile communication device 110 may be in short range communication with each other. For example, the beacon device 120 and the mobile communication device 110 may communicate with each other using BLE. In some embodiments, the mobile communication device 110 and the beacon device 120 may communicate with each other if they are within about 100 meters, 50 meters, or even 10 meters of each other, but may not communicate with each other outside of these ranges.

Although this example describes the use of a BLE communication mechanism, it is understood that embodiments of the invention may utilize any suitable wireless communication mechanism. Examples of such communication mechanisms may include the use of a suitable electrical, electromagnetic, or even acoustic mode of communication. For example, embodiments of the invention may use RF, IR, or even audio signals to transmit data to and from two devices in a wireless manner. Preferred communication mechanisms include short-to-medium range wireless communication mechanisms. Examples of communication mechanisms may include Wi-Fi, BLE, classic Bluetooth, etc.

In some embodiments, BLE technology is used as the short range communication protocol or technology. Bluetooth Low Energy is a wireless personal area network technology used for transmitting data over short distances. It is designed for low energy consumption and cost, while maintaining a communication range similar to classic Bluetooth. BLE communication consists primarily of "advertisements," or small packets of data, broadcast at a regular interval by beacons (which may be present in or be a base station) or other BLE enabled devices via radio waves.

The location 108 may also include a number of objects including a first object 170 including first indicia 170A, and a second object 180A including second indicia 180A. Although only two objects are illustrated in FIG. 1, it is understood that embodiments of the invention may include any other suitable number of objects. The objects 170, 180 may be objects in a store such as store merchandise. The indicia 170A, 180A associated with the objects 170, 180 may be data identifying the objects such as item identifiers such as product identifiers. Such product identifiers may take the form of barcodes, data in RF ID tags, or plaintext product identifiers that can be read by devices with character recognition software.

The system may also include a number of components that are remote from the location 108. Such components may include an authentication system 130, which may be in operative communication with the beacon device 120 and the mobile communication device 110.

The mobile communication device 110 and/or the beacon device 120 may also be in operative communication with the remote access device 140. The remote access device may also be in communication with an authorizing entity computer 150, which can authorize or not authorize authorization request messages from the remote access device 140. A transaction processing computer, and a transport computer such as an acquirer computer, may be disposed between the remote access device 140 and the authorizing entity computer 150.

A resource provider computer 190 may be in communication with the remote access device 140. The barrier device 192 may be in communication with the remote access device 140 via the resource provider computer 190. In other embodiments, the barrier device 192 may be in direct communication with the remote access device 140 and/or the beacon device 120.

The various devices, components, and entities in FIG. 1 may communicate using any suitable types of communications networks. The communications networks may comprise a plurality of networks for secure communication of data and information between entities. In some embodiments, communications networks may follow a suitable communication protocol to generate one or more secure communication channels. A communication channel may, in some instances, comprise a "secure communication channel," which may be established in any known manner, including the use of mutual authentication and a session key and establishment of an SSL session. However, any method of creating a secure channel may be used. By establishing a secure channel, sensitive information may be securely transmitted.

Any suitable communications protocol may be used for generating a communications channel. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described in system may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
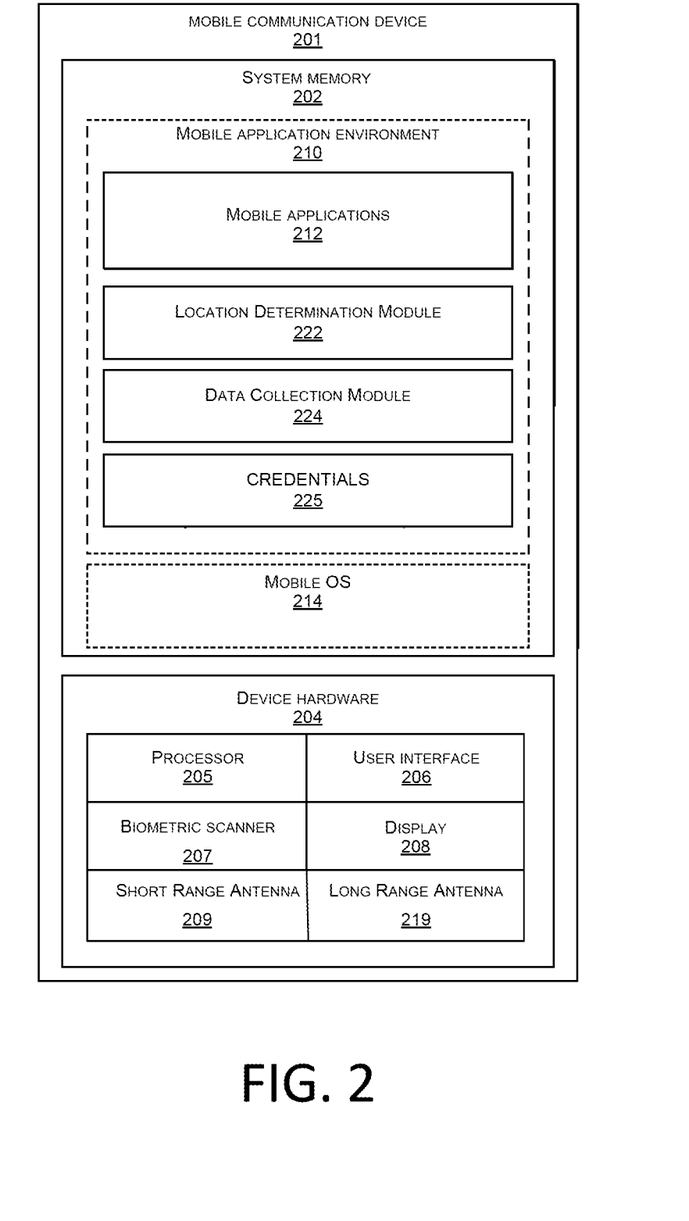
FIG. 2 shows a diagram of a mobile communication device according to an embodiment of the invention.

FIG. 2 illustrates a mobile communication device 201 according to an embodiment of the invention. Mobile communication device 201 may include device hardware 204 coupled to a system memory 202.

Device hardware 204 may include a processor 205, a short range antenna 209, a long range antenna 219, a biometric scanner 207, a user interface 206, and a display 208 (which may be part of the user interface 206). The processor 205 can be implemented as one or more integrated circuits (e.g., one or more single core or multicore microprocessors and/or microcontrollers), and is used to control the operation of mobile communication device 201. The processor 205 can execute a variety of programs in response to program code or computer-readable code stored in the system memory 202, and can maintain multiple concurrently executing programs or processes. The long range antenna 219 may include one or more RF transceivers and/or connectors that can be used by mobile communication device 201 to communicate with other devices and/or to connect with external networks. The user interface 206 can include any combination of input and output elements to allow a user to interact with and invoke the functionalities of mobile communication device 201. The biometric scanner 207 may be configured to capture any suitable biometric including a fingerprint, retina, facial image, etc. The short range antenna 209 may be configured to communicate with external entities through a short range communication medium (e.g., using Bluetooth, Wi-Fi, infrared, NFC, etc.). The long range antenna 219 may be configured to communicate with a remote base station and a remote cellular or data network, over the air.

The system memory 202 can be implemented using any combination of any number of non-volatile memories (e.g., flash memory) and volatile memories (e.g., DRAM, SRAM), or any other non-transitory storage medium, or a combination thereof media. System memory 202 may store a mobile OS 214 and a mobile application environment 210 where one or more mobile applications 212 reside (e.g., a payment application such as a mobile wallet application, merchant application, mobile location application, etc.) to be executed by the processor 205. Also, the system memory 202 may store computer code, executable by the processor 205, for performing any of the functions described herein.

The system memory 202 may also store a location determination module 222, a data collection module 224, as well as credentials 225. The location determination module 222 may comprise instructions for determining a location of the mobile communication device 201. The data collection module 224 may comprise instructions for collecting data prior to transmitting the data to an access device such as a remote access device. In some embodiments, the data collection module 224 may comprise instructions for instructing the processor 205 to gather indicia (e.g., item information) associated with a plurality of objects, and also appropriate payment credentials (e.g., a PAN or payment token) for transmission in a message to an access device such as a remote access device.

System memory 202 may also store credentials 225. Credentials 225 may include information identifying the mobile communication device 201 and/or the user of the mobile communication device 201. Examples of credentials may include a public key associated with the mobile communication device 201 and/or a user of the mobile communication device 201, a digital signature (e.g., the public key of the mobile communication device 201 signed by a key of the authentication system), payment credentials such as PANs or payment tokens, biometric data (e.g., biometric samples or templates), etc.

Figure 3:
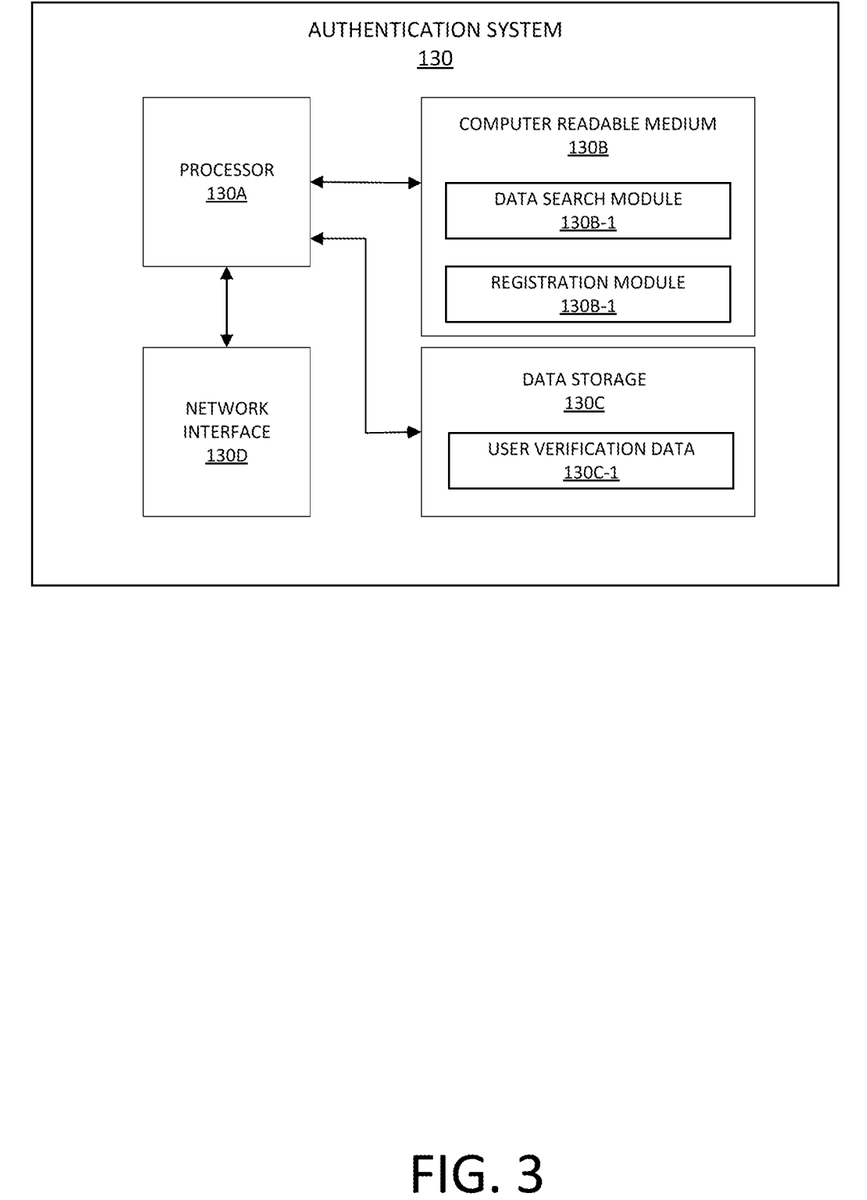
FIG. 3 shows a block diagram of an authentication system according to an embodiment of the invention.

FIG. 3 shows a block diagram illustrating some components in an authentication system 130. The authentication system 130 may have one or more processors 130A, coupled to a computer readable medium 130B, data storage 130C, and network interface 130D.

The computer readable medium 130B may comprise a data search module 130B-1 and a registration module 130B-2. The data search module 130B-1 may comprise instructions for instructing the one or more processors 130A to search for user verification data 130C-1 in the data storage 130C and to verify that a purported user is in fact authentic and registered with the authentication system 130. The registration module 130B-2 may comprise instructions for instructing the one or more processors 130A to register entities in the authentication system 130, and recording user verification data 130C-1 to the data storage 130C.

In some embodiments, the authentication system 130 may be in the form of a central computer system. In other embodiments, the authentication system 130 may be in the form of a distributed network of nodes. In such embodiments, the authentication system 130 may include a blockchain, which may be continually updated and stored within the individual nodes.

Figure 4:
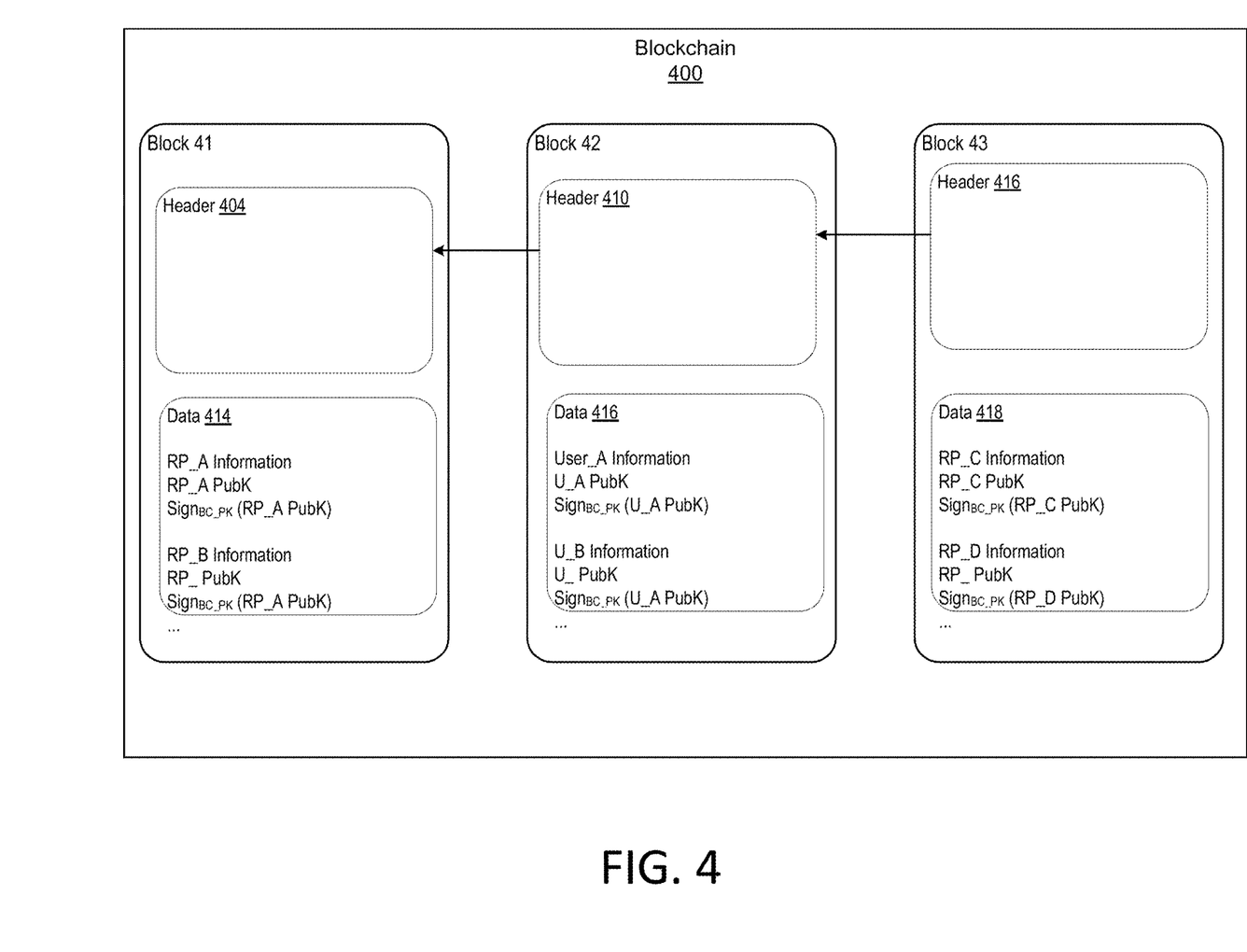
FIG. 4 shows an example of a portion of a blockchain according to an embodiment of the invention.

FIG. 4 shows an example of a portion of a blockchain 400, which may include a number of blocks 41, 42, 43, each block including respective headers 404, 410, 416. Each header 404, 410, 416 may include data elements including version numbers, previous block hashes, merkle roots, and timestamps. Each block may also include data 412, 414, 418 including information about each entity being registered (e.g., name, address, phone number, e-mail address, etc.), an identifier for the entity (e.g., a public key of the entity), and a digital signature (e.g., a public key of the entity signed by the blockchain 400 or the node of the blockchain 400).

In FIG. 4, RP_A Information may be the name, address, and contact information for a resource provider A. RP_A PubK may be a public key associated with resource provider A (the corresponding private key may be stored in the resource provider A's computer, access device, or beacon device. $Sign_{BC\_PK}$ (RP_A PubK) may be a digital signature that is the public key of resource provider A, signed by a private key of the blockchain 400. User_A Information may be information about a particular user (e.g. the name, contact information, and address). U_A PubK may be a public key associated with user A (the corresponding private key may be stored on User A's mobile communication device). $Sign_{BC\_PK}$ (U_A PubK) may be a digital signature that is the public key of user A, signed by a private key of the blockchain 400.

Figure 5:
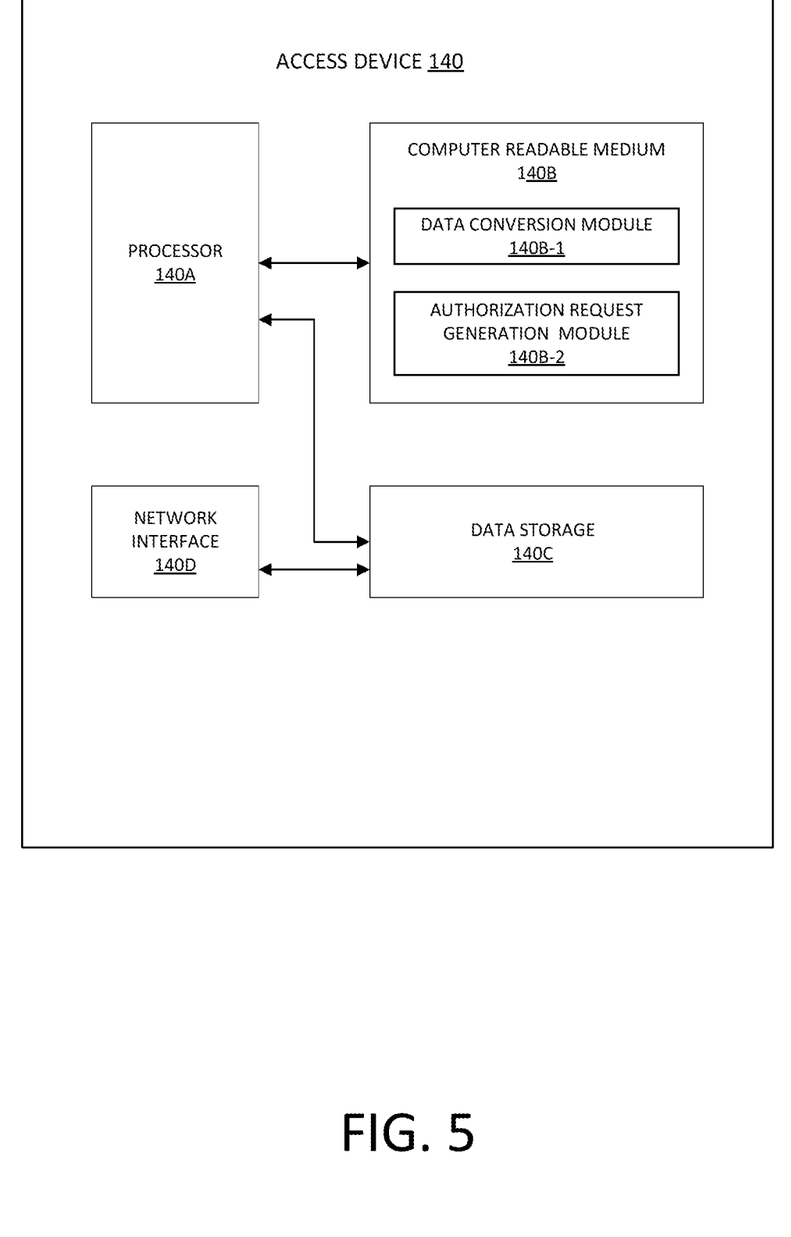
FIG. 5 shows an example of a remote access device according to an embodiment of the invention.

FIG. 5 shows a block diagram of an exemplary access device 140. The access device 140 may comprise a processor 140A coupled to a computer readable medium 140B, a data storage 140C, and a network interface 140D. The computer readable medium 140B may include a data conversion module 140-B1, and an authorization request generation module 140B2. The data conversion module 140-B1 may include instructions for causing the processor 140A to convert data received from the beacon device 120 or the mobile communication device 110 from one format into another. For example, data from the beacon device 120 or mobile communication device 110 may in an XML data format, and this data may be converted into an ISO 8583 format for transmission in an authorization request message (and vice-versa for an authorization response message). The authorization request generation module 140B-2 may include instructions for causing the processor 140A to generate and transmit an authorization request message to an authorizing entity computer, and to receive an authorization response message from the authorizing entity computer.

Methods according to embodiments of the invention will now be described with reference to FIG. 1 and other Figures.

Prior to performing the steps in FIG. 1, the mobile communication device 110, and the resource provider computer 190 and/or the beacon device 120 may register with the authentication system 130. In some embodiments, the authentication system 130 may perform various verification processes before allowing each entity to register. For example, each entity may need to provide proof (e.g., identification, biometrics, device identifiers) that the devices being registered are associated with the entities that are purported to own or operate those devices. In the case of a user, the user may need to provide data to the authentication system 130 which shows that he or she actually owns the mobile communication device 110 and that any payment credentials associated with the mobile communication device 110 belong to the user.

If the authentication system 130 operates a blockchain or a blockchain network, then in some embodiments, each individual device may generate a public/private key pair, and may transmit its public key to the blockchain. The blockchain (or one or more of the nodes of the blockchain) may then sign the public key, and may record the resulting digital signature in the blockchain, optionally along with other data associated with the individual device. The digital signature may be provided back to the device being registered. The credential that is used to establish the identity for that device may include the digital signature and the corresponding public key of that device.

As an illustration of this, at step S1, the beacon device 120 or the resource provider computer 190 associated with the location 108 may generate a public/private key pair and may transmit the public key to the authentication system 130. The authentication system 130 may then sign the public key with its private key to form a digital signature. In step S2, the digital signature may then be transmitted from the authentication system 130 to the beacon device 120 and/or the resource provider computer 190. In other embodiments, the beacon device 120 could alternatively provide the authentication system 130 with a beacon device identifier. The authentication system 130 could validate that the beacon device 120 is authentic and is associated with a particular resource provider and could store that beacon device identifier in a data storage. The mobile communication device 110 may register with the authentication system 130 in the same or different manner than the beacon device 120. The registration process with the authentication system 130 may occur before or during the time that the user and the mobile communication device 110 are present in the location 108.

At step S3, after the beacon device 120 and the mobile communication device 110 have registered with the authentication system 130, the beacon device 120 may transmit a broadcast signal to the mobile communication device 110. The broadcast signal (e.g., a BLE advertisement) may encode a first credential associated with a first entity such as the resource provider. For example, the first credential may include the public key of the resource provider, the previously described digital signature, and an optionally an identifier for the first entity. The identifier for the first entity may include, for example, the name and location of the first entity (e.g., "Safeway Store 133 at 921 E. Hillsdale Blvd, Foster City, CA"). The mobile communication device 110 may then receive that broadcast signal with the first credential. In response to receipt of the broadcast signal, the mobile communication device 110 may determine the authentication system 130. In some cases, the mobile communication device 110 may contain an application of the resource provider and the application may have the address of the authentication system 130.

At step S4, the mobile communication device 110 transmits the received first credential to the authentication system 130. After the authentication system 130 receives the first credential, the authentication system 130 determines if the first entity associated with the broadcast signal is authentic and has previously registered with the authentication system 130. The authentication system 130 may check its records to determine if it can verify that the first credential provided by the beacon device 120 is associated with the public key and the digital signature. For example, the authentication system 130 can use its public key to verify the received digital signature by determining that it in fact previously signed the first entity's public key to form the received digital signature. In other embodiments, instead of using asymmetric cryptographic techniques, the authentication system 130 may have previously created the digital signature by signing the beacon device's public key with a secret symmetric key. When the authentication system 130 receives the digital signature, it can use the symmetric key to determine that it previously signed the beacon device's public key.

In FIG. 1, if the authentication system 130 determines that the first entity associated with the beacon device 120 is authentic, then in step S5, it generates and transmits a confirmation message indicating that the first entity is authentic to the mobile communication device 110.

In step S6, once the mobile communication device 110 has determined that it is in fact communicating with an authentic first entity, then the mobile communication device 110 may transmit a communication comprising a second credential to the beacon device 120.

In step S7, the beacon device 120 thereafter transmits the second credential to the authentication system 130, and the authentication system 130 determines if the mobile communication device 110 is authentic. The authentication system 130 may check its records to determine if it can verify that the identifier provided by the mobile communication device 110 is associated with the public key and the digital signature. The authentication system 130 can use its public key to verify that it in fact previously signed the second entity's public key to form the received digital signature. In other embodiments, instead of using asymmetric cryptographic techniques, the authentication system 130 may have previously created the digital signature by signing the mobile communication device's public key with a secret symmetric key. When the authentication system 130 receives the digital signature, it can use the symmetric key to determine that it previously signed the mobile communication device's public key.

If it can verify and authenticate the mobile communication device 110, then the authentication system 130 can generate a confirmation message confirming the authenticity of the mobile communication device 110 and can transmit that confirmation message to the beacon device 120 in step S8. Note that steps S3-S8 can be performed without any involvement or specific knowledge of the user.

At this point, the mobile communication device 110 and the beacon device 120 have determined that the other is authentic. The beacon device 120 may then initiate an interaction process with a user of the mobile communication device in step S9. In some embodiments, the interaction process may be a purchase transaction. In other embodiments, the interaction process could be the ability to access a particular location or access data that may be in a secure location.

In the interaction process in some embodiments of the invention, the beacon device 120 may activate an application in the mobile communication device 110 so that the application may be allowed to start collecting object data. For example, the user may use the mobile communication device 110 to scan each of the first and second objects 170, 180, and any other objects to obtain the indicia 170A, 180A from them. In some embodiments, the user may take the mobile communication device 110 and may take pictures of the objects to be purchased, or may scan barcodes or RFID tags associated with the objects. In another embodiment, the user may place the objects to be purchased in a movable container such as a shopping cart or shopping basket. The shopping cart or basket may have a communication module that can automatically detect the indicia associated with the objects placed therein. The communication module may also relay that information to the mobile communication device 110 where the information about the gathered objects can be collected and aggregated.

Once the user of the mobile communication device 110 has gathered all of the desired objects at the location 108, the user may indicate this to the mobile communication device 110. For example, a button on the application on the mobile communication device 110 may be selected to signal to the mobile communication device 110 that the user is done shopping. In other embodiments, the user need not specifically interact with the user's mobile communication device 110. For example, a location determination module 222 in the mobile communication device 110 may determine that the user is attempting to exit the location 108. As a result, the location of the mobile communication device 110 may cause the mobile communication device 110 to recognize that the user is done shopping. In yet other embodiments, as will be explained in further detail below, a "pre-authorization" process for a certain amount can be performed while the user is shopping. The actual amount of the purchases made by the user can be calculated when the user exits the location 108 or even after the user leaves the location 108.

The mobile communication device 110 may then generate a message including the indicia (e.g., item identifiers) of the collected objects as well as other credentials for the mobile communication device 110. Other credentials may include the public key of the mobile communication device 110, a PAN (primary account number) or payment token stored in the mobile communication device 110, a device identifier for the mobile communication device, etc. This message may then be transmitted from the mobile communication device 110 to the remote access device 140 in step S11. In other embodiments, the access device need not be remote, but could be in location 108.

If it is not in the appropriate format to be received by the authorizing entity computer 150, then the remote access device 140 may generate an authorization request message for transmission to the authorizing entity computer 150. For example, the data conversion module 140B-1 in the remote access device 140 may remove the object indicia from the message, and may format an ISO 8583 message that includes a PAN or payment token, as well as an amount of the purchase.

This authorization request message may be transmitted to the authorizing entity computer 150 in step S12 directly, or via a transport computer and/or a transaction processing computer as noted above. In step S13, the authorizing entity computer 150 may transmit an authorization response message back to the remote access device 140 approving or disapproving of the transaction. The authorization response message may be transmitted from the authorizing entity computer 150 to the remote access device 140 via a transaction processing computer and/or a transport computer.

At the end of the day or some other period of time, a clearing and settlement process can occur between the authorizing entity computer 150 and an acquirer of the resource provider operating the location 108.

In the above example, the authorization request message contains the exact amount of the objects being purchased. In other embodiments, a "pre-authorization request message" may be transmitted by the remote access device 140 to the authorizing entity computer 150 before the user has finished acquiring all of the desired objects. For example, the pre-authorization request message may transmit a request to "hold" $500 on the user's account. After the user has finished obtaining the objects for purchase, the real total for the objects may be calculated and another authorization request message may be transmitted to the authorizing entity computer 150. The prior hold is released after the real authorization request message is approved. The actual authorization for the actual amount may take place when the user is leaving the location 108 or even after the user leaves the location 108.

In step S14, the remote access device 140 may transmit a notification or may transmit the authorization response message to the mobile communication device 110. The notification and/or the authorization response message may also be optionally transmitted to the beacon device 120 and/or the resource provider computer 190. In step S15, the resource provider computer 190 may receive the authorization response message. It may include the authorization status of the transaction, and it may also include the indicia for the objects obtained by the user. The list of indicia for the objects desired by the user and the authorization status of the transaction may then be transmitted to the barrier device 192. The barrier device 192 may now have the authorization status for the transaction, a credential for the mobile communication device 110, and the indicia for the objects obtained by the user.

When the user of the mobile communication device 110 attempts to leave the location 108, she will have the objects in her possession. Those objects may then be automatically scanned at the barrier device 192 and matched against the list of approved/purchased objects received from the remote access device 140. For example, the objects may have RFID tags that may be automatically scanned by the barrier device 192 as the user attempts to leave the location 108. If the user is leaving the location 108 with any objects that were not authorized for purchase, then the barrier device 192 can prevent the user from leaving the location 108.

Embodiments of the invention have a number of advantages. As illustrated above, embodiments of the invention provide for a hands-free interaction method, whereby users can quickly and conveniently obtain objects such as goods, and purchase them without interacting with their mobile communication device 110 or by interacting with them in a very minimal way. In addition, prior to concluding the interaction or purchase, the user's mobile communication device 110 and beacon device 120 automatically verify each other using an authentication system. The interaction between the mobile communication device 110 and the beacon device 120 is trusted, even though they may not be proximate to each other and even though this may be the first time that they have interacted with each other.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
   receiving, by a mobile communication device operated by a user, a broadcast signal from a beacon device associated with a first entity and a location, the broadcast signal encoding a first credential associated with the first entity;
   transmitting, by the mobile communication device, the first credential to an authentication system, wherein the authentication system determines that the first entity associated with the broadcast signal is authentic using the first credential and generates a confirmation message confirming authenticity of the first entity;
   receiving, by the mobile communication device from the authentication system, the confirmation message confirming the authenticity of the first entity;
   transmitting, by the mobile communication device to the beacon device, a communication indicating that the authenticity of the first entity is confirmed, wherein, in response to receiving, by the beacon device from the mobile communication device, the communication indicating that the authenticity of the first entity is confirmed, the beacon device initiates an interaction with the mobile communication device by activating an application for collecting an item data on the mobile communication device, wherein the application is configured to start collecting the item data in response to being activated by the beacon device; and
   in response to receiving through the application on the mobile communication device a user input indicating an end of the interaction or in response to determining by the mobile communication device that the mobile communication device is positioned at the location, transmitting, by the mobile communication device to an access device, a message comprising a first item identifier corresponding to a first item, the first item identifier being collected by the application as a part of the item data,
   wherein receiving the message comprising the first item identifier by the access device causes the access device to transmit, to an authorizing entity computer, an authorization request message and the first item identifier, and
   wherein receiving an authorization response message comprising the first item identifier from the authorizing entity computer, causes the access device to transmit the authorization response message comprising the first item identifier to a barrier device positioned at the location and configured to allow the user to leave the location based on the barrier device scanning an item at the location to obtain an item identifier and identifying that the first item identifier from the authorization response message matches the item identifier of the scanned item.

2. The method of claim 1, wherein the first item identifier is collected by the mobile communication device based at least in part on scanning or receiving data that comprises the first item identifier.

3. The method of claim 1, wherein the access device is remote with respect to the location.

4. The method of claim 1, wherein the message comprising the first item identifier that is transmitted by the mobile communication device further comprises a second credential associated with the mobile communication device.

5. The method of claim 1, wherein transmitting the message comprising the first item identifier to the access device causes the access device to generate and transmit the authorization request message while excluding the first item identifier.

6. The method of claim 5, wherein the access device, subsequent to receiving the message, transmits a subsequent message, the subsequent message comprising the first item identifier.

7. The method of claim 6, wherein the access device transmits, using the subsequent message, the first item identifier to the barrier device.

8. The method of claim 1, wherein the mobile communication device collects object data from a movable container, the object data comprising the first item identifier.

9. The method of claim 1, wherein the beacon device is associated with a resource provider computer, and wherein the beacon device is configured to initiate the interaction by prompting the mobile communication device to transmit collected object data to the access device.

10. A mobile communication device comprising:
    one or more processors; and
    a memory including instructions that, when executed by the one or more processors, cause the mobile communication device to perform a method including:
       receiving a broadcast signal from a beacon device associated with a first entity and a location, the broadcast signal encoding a first credential associated with the first entity;
       transmitting the received first credential to an authentication system, wherein the authentication system determines that the first entity associated with the broadcast signal is authentic using the first credential and generates a confirmation message confirming authenticity of the first entity;
       receiving, from the authentication system, the confirmation message confirming the authenticity of the first entity;
       transmitting, to the beacon device, a communication indicating that the authenticity of the first entity is confirmed, wherein, in response to receiving, by the beacon device, the communication indicating that the authenticity of the first entity is confirmed, the beacon device initiates an interaction with the mobile communication device by activating an application for collecting an item data on the mobile communication device, wherein the application is configured to start collecting the item data in response to being activated by the beacon device; and
       in response to receiving through the application on the mobile communication device a user input indicating an end of the interaction or in response to determining by the mobile communication device that the mobile communication device is positioned at the location, transmitting to an access device, a message comprising a first item identifier corresponding to a first item, the first item identifier being collected by the application as a part of the item data, wherein receiving the message comprising the first item identifier by the access device causes the access device to transmit, to an authorizing entity computer, an authorization request message and the first item identifier, and wherein receiving an authorization response message comprising the first item identifier from the authorizing entity computer, causes the access device to transmit the authorization response message comprising the first item identifier to a barrier device positioned at the location and configured to allow a user of the mobile communication device to leave the location based on the barrier device scanning an item at the location to obtain an item identifier and identifying that the first item identifier from the authorization response message matches the item identifier of the scanned item.

11. The mobile communication device of claim 10, wherein the method further includes transmitting, to the beacon device, a second message comprising a second credential for the mobile communication device, and wherein the authentication system, in response to receiving the second message, 1) determines if the mobile communication device is authentic and 2) generates a second confirmation message confirming the authenticity of the mobile communication device.

12. The mobile communication device of claim 10, wherein the message is a first message and transmitting the first message corresponds to reserving resources associated with an account associated with a user of the mobile communication device.

13. The mobile communication device of claim 10, wherein the authentication system is a distributed record system.

14. The mobile communication device of claim 10, wherein the authentication system comprises a blockchain network that maintains a blockchain comprising a plurality of blocks, at least one block of the plurality of blocks storing a block hash of a previous block in the blockchain, the blockchain storing the first credential in a corresponding block, and wherein determining that the first entity associated with the broadcast signal is authentic includes verifying that the first credential received from the mobile communication device matches the first credential stored in the blockchain.

15. The mobile communication device of claim 14, wherein the first credential stored in the blockchain comprises a digital signature generated by the blockchain network.

16. The mobile communication device of claim 15, wherein the method further includes:
generating, by the mobile communication device, a key pair comprising a public key and a private key corresponding to the mobile communication device; and
transmitting the public key to the blockchain network causing a computing device of the blockchain network to generate the digital signature and store the digital signature in the blockchain for subsequent use.

17. The mobile communication device of claim 10, further comprising:
a short-range antenna configured to communicate with the beacon device; and
a long-range antenna configured to communicate with the authentication system.

18. The mobile communication device of claim 10, wherein the barrier device is configured to restrict a user from leaving the location based at least in part on identifying that the first item identifier fails to match the item identifier of the scanned item.

* * * * *